June 15, 1965 R. BEAU 3,189,414
COUNTERCURRENT LIQUID-LIQUID EXTRACTION APPARATUS
Filed April 10, 1961 3 Sheets—Sheet 1

INVENTOR.
RAYMOND BEAU
BY
Bauer and Seymour
ATTORNEYS

June 15, 1965 R. BEAU 3,189,414
COUNTERCURRENT LIQUID-LIQUID EXTRACTION APPARATUS
Filed April 10, 1961 3 Sheets-Sheet 2

INVENTOR.
RAYMOND BEAU
BY Bauer and Seymour
ATTORNEYS

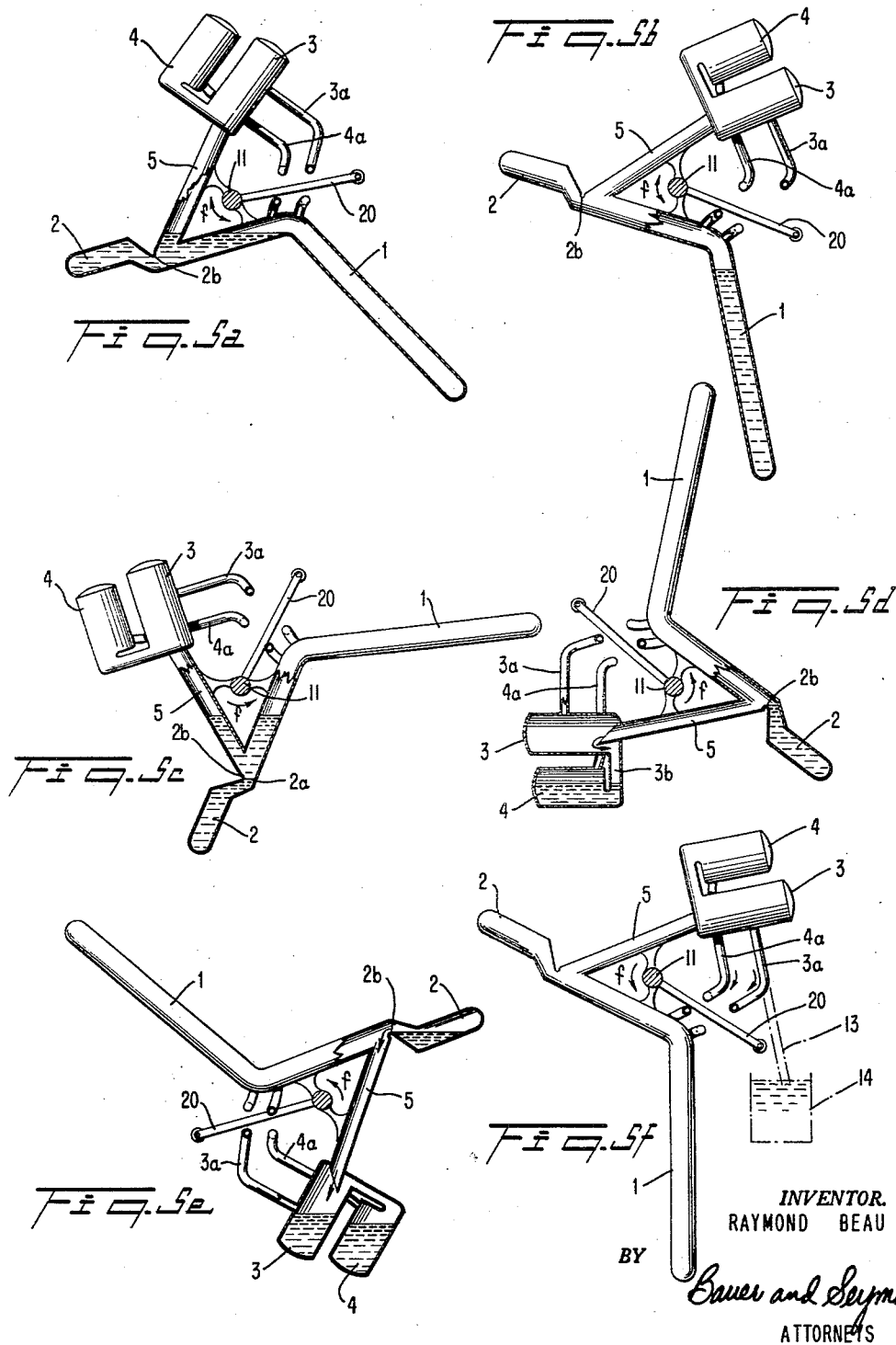

3,189,414
COUNTERCURRENT LIQUID-LIQUID EXTRACTION APPARATUS

Raymond Beau, Massy, Seine-et-Oise, France, assignor to Societe Anonyme les Produits Semi-Conducteurs, Paris, France
Filed Apr. 10, 1961, Ser. No. 102,013
Claims priority, application France, Jan. 21, 1961, 850,415
2 Claims. (Cl. 23—270.5)

The present invention relates to an apparatus for bringing into contact by countercurrent flow two immiscible liquids, this apparatus being useful for the carrying out of processes such as extraction, purification, elution and clarification. The novel process which forms a part of this invention and the apparatus, are useful in the production of substances with a high degree of purity.

The apparatus habitually used to accomplish purifications by extraction between two immiscible liquids such as filled columns, pulsating columns and the like have certain imperfections. It is difficult to calculate for filled columns, even approximately, the height theoretically necessary for a stage of extraction so that one is led either to provide heights of column too low to produce complete extraction or, on the contrary, to adopt heights which are excess for the desired end. In pulsating columns the uncertainty about the amplitude and frequency of the pulsations leads to constructions which are long and imperfect. In all cases, the different columns have the imperfection that one cannot prevent the mixing of liquid phases of every stage in case of the accidental malfunction of the apparatus. The apparatus which includes at every stage an agitating chamber and a decantation chamber requires the installation of as many agitators and pumps as there are stages, so that they become complex and expensive.

It is an object of this invention to overcome the aforesaid inconveniences and to automatically effectuate the mixing of the two liquid phases, the decantation, the separation of the mixed phases, and the sending of the separated phases in different directions. Another object is to provide an apparatus which can be readily made to have as many stages as are necessary. Other objects are to provide a novel method for insuring the complete contact of immiscible liquids, and perfect separation, and thus to obtain superior results in extraction, purification, elution and the like.

The objects of the invention are accomplished, generally speaking, by a process of treating a plurality of immiscible liquids for extraction, purification, elution or the like which comprises flowing the liquids in generally parallel, oppositely directed streams, repeatedly mixing, shaking, and separating adjacent parts of the said streams, and isolating the fully treated liquids. The objects as to apparatus are accomplished by apparatus for mixing immiscible liquids which comprises a rotatable shaft and mounted thereabout for rotation therewith a mixing chamber having inlet means adapted to receive a plurality of immiscible liquids, a decanter at one end of said chamber, a plurality of receptacles adapted to receive the liquids separated by the decanter and means to discharge the liquids from the receptacles. The apparatus according to the invention, includes a plurality of identical elements all mounted about a single horizontal axis of rotation, each element communicating with those adjacent to it and including a compartment for the reception of liquid, a decanter associated with the compartment, pairs of chambers to receive the liquids separated by decantation and means to discharge these chambers either finally or to adjacent elements of the apparatus, the various functions of mixing, agitation, separation and dispatch being carried out by the rotation of the apparatus.

The apparatus includes means to supply each unit or element with a precisely measured quantity of the two liquids which are to treat each other. The agitation of the liquids is obtained by shaking them together and this is produced by a limited reciprocation of the mixing chamber in one of the positions of the apparatus. The separation of the mixed liquids into phases is obtained by arranging the apparatus in another of its positions. The isolation of the two liquids from each other is obtained by turning the apparatus into another position, and the discharge is obtained by a still further rotation of the units. These movements of the apparatus can be timed so that each function will be carried out for that period which is necessary to it.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIGURE 1 is a diagrammatic view along the axis of rotation of the apparatus, showing a single unit of the apparatus;

FIGURE 3 is a diagrammatic view along the axis of rotation illustrating the measuring devices which supply the apparatus with the liquids which are to undergo treatment;

FIGURE 4 is a fragmentary elevational view of the apparatus of FIGURE 3 perpendicular to the axis of rotation; and FIGURES 5a–5f illustrates the positions of operation of the apparatus.

Figure 1:
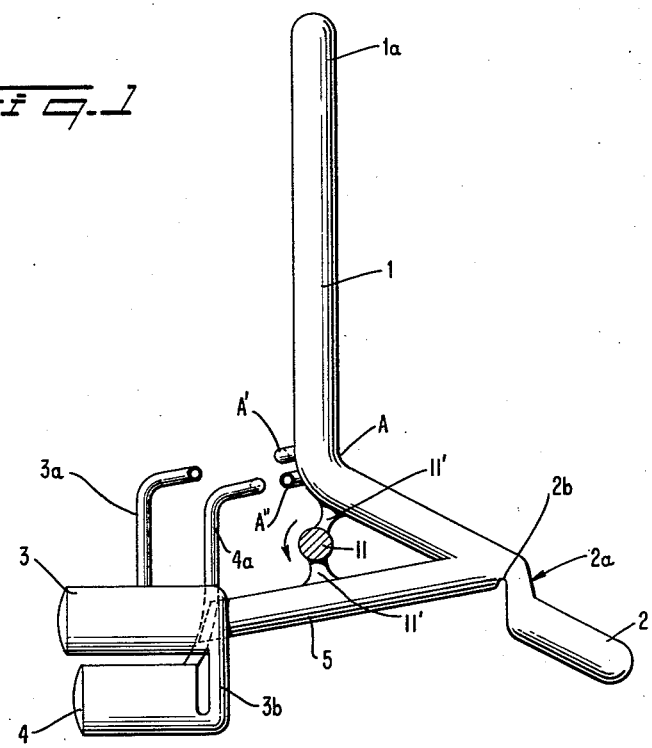
Figure 2:
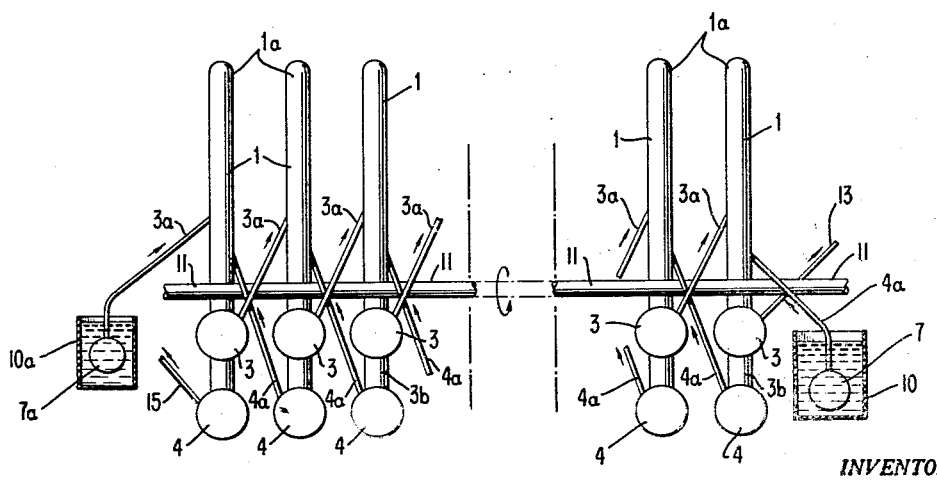
FIGURE 2 is a diagrammatic view perpendicular to the axis of rotation showing a number of units assembled on a single shaft.

There is shown in FIGURE 2 an apparatus having a shaft 11 on which are mounted a number of units 1 of which five are shown. Each unit, as shown in FIGURE 1, includes essentially four compartments including an elongated tube 1, 2 which is closed at end 1a, is angularly bent at A about 120° and has at its end 2 a constriction 2a which forms internally a kind of dam 2b. A tube 5 connects the tube 1 and the ampule 2 to two receptacles or containers 3, 4 which are themselves interconnected by a conduit 3b. From the middle of container 3 a tube 3a leads away to an adjacent unit or to discharge and from the end of container 4 a tube 4a leads away to an adjacent unit or to discharge. Inlet tubes A', A" serve to supply the tube 1 with the different liquids which are to be treated, which may be derived either from adjacent units or from a source of supply. This unit is mounted on shaft 11 by supports 11' so that it will turn with the shaft and the other units are similarly mounted in the same alignment as shown in FIGURE 2.

Referring now to FIGURE 3 the tube 1 may be filled from a tank 10 by means of a dipper 7 which is provided with an opening 8 allowing for the entry of liquid and the escape of gases. This dipper is provided with a constriction 9 opposite the lower end of the orifice 8 and provides, when the shaft 11 has been rotated to the dotted line position an exact level 12 of liquid so that anything above that level flows back into the tank through the opening 8. The location of the orifice 8 is such that, when the apparatus is in the dotted line position of FIGURE 3, the level 12 assumed by the liquid inside is horizontally in line with the bottom of a bend 17 in the tube 4a which connects the dipper 7 with the mixing tube 1. When the shaft 11 is further rotated the liquid in dipper 7 flows over the bend 17 into the tube 1 and is received in one end of that tube as shown in FIGURE 5b, it being clear that all the liquid in dipper 7 will run into the tube 1 through tube 4a when the shaft is turned far enough.

Referring now to FIGURES 5a to 5f it may be assumed that the shaft 11 is provided with a hand crank 20 for manual operation, although in preferred practice the device will be put through its steps of operation mechanically in accordance with a schedule accurately set up and automaically timed. By rocking the crank 20 back and forth as shown in FIGURES 5a and 5b, the liquid will flow from end 2 to end 1a, back and forth, thereby receiving a thorough shaking and a thorough mixing which is aided by the angularity of the tube, its elongated and relatively thin dimensions, and by the offset adjacent ampule 2. This rocking motion can be continued until efficient intermixing of the two phases has been attained, in effect, a complete contact of the two phases has been achieved.

The intermixed phases should now be allowed to settle out and form one above the other in accordance with their gravities and this is illustrated in FIGURE 5c wherein there is shown at 2a the interface between the two liquids opposite the dam 2b. In operating this apparatus the capacity of the dippers 7 and 7a, located respectively at opposite ends of the shaft 11, which take their liquids out of tanks 10 and 10a respectively, is such that the quantity of the heavier liquid will reach the dam 2b.

By further rotation of the shaft in the direction of the arrow f to the position in FIGURE 5d, the liquid above the dam pours through tube 5 into container 3 and thence through tube 3b into container 4, being thus automatically isolated from the other liquid which still remains in the ampulse 2. Thus, a complete and substantially perfect decantation is carried out.

By further rotation of the shaft 11 to the position in FIGURE 5e the liquid in ampule 2 pours over the dam and into the container 3, the position of the apparatus preventing any flow from container 3 into container 4. Containers 3 and 4 are provided with discharge pipes 3a, 4a, respectively, which lead their respective liquids in opposite directions, as shown in FIGURE 5f wherein, by additional rotation of shaft 11 the liquid in container 4 is transferred, for instance, to the adjacent unit on one side and the liquid from container 3 is transferred to the adjacent unit on the other side. At the same time that these tubes are discharging the containers 3 and 4 to other units, other units are filling the tube 1. This can be comprehended by a consideration of FIGURE 2.

In FIGURE 2 tanks 10, 10a contain two immiscible liquids and dippers 7, 7a take measured quantities of these liquids and, as the shaft 11 is rotated beyond the position shown in dotted lines in FIGURE 3 a flow of liquid 10 begins from right to left and a flow of liquid 10a begins from left to right. This flow continues until the entire apparatus is filled in accordance with its capacity and the following operation occurs: The liquid 10a flowing through tube 3a proceeds into the mixing chamber 1 at the left, where it is mixed with the head of the liquid 10 which has flowed through the apparatus from the right. The two liquids are mixed, decanted and separated and the liquid 10a is discharged through the second tube 3a into the second unit from the left, where it undergoes another mixing and decantation until it is finally discharged through tube 13. If we assume that 10a is the liquid to be purified and that 10 is the liquid which is to do the purifying, the liquid discharged at 13 will be in a very high state of purity, having flowed from left to right and having undergone shaking and decantation in each unit with a different portion of the purifying liquid 10. In the meantime, the purifying liquid 10 has been flowing from right to left through the succession of tubes 4a into the several units, undergoing mixing and decantation in each unit and is finally discharged at 15 in a highly contaminated state, having, in the case in mind, extracted its impurities from the liquid 10a.

The angular arrangement of the parts about the shaft 11 is indicated in the drawing for one each apparatus but these can be adjusted to accomplish different ends. The angle in the tube 1–2 is, in the drawing, about 120°. The axis of tube 5 makes an internal angle of about 40° with the tube 1. The axis of tube 5 makes an angle of about 9° with the axis of ampules 3 and 4.

It is to be observed that the heavier of the two liquids should be measured with exactitude whereas it is not so important to so measure the lighter liquid. The positions shown in the figures are, generally speaking, approximate. Because of this arrangement the volume of the liquid admitted and discharged at each cycle is the same.

This apparatus has many advantages, particularly that an extraction is carried forward without any lost time and without the risk of mixing liquid from different stages in case of accidental malfunctioning. The apparatus permits the ready discharge of the product while providing for continuous operation, which improves the yield. The sizes of the particular units measured along the shaft allows one to associate in a single apparatus a very large number of units thus multiplying the number of stages and producing a very high efficiency of purification or separation.

When the extraction includes the successive use of several different extractor liquids, which would require a sequence of operations, it is possible to use several series of elements mounted on a single shaft, each series corresponding to a particular extraction operation. This arrangement is particularly advantageous when there is a phase common to the different stages of extraction and this occurs notably when, after a first extraction, one wishes to employ an immiscible reactant, to react with a material which is dissolved in one of the phases, and in which one proceeds later to eliminate the excess of the reactant by washing with an appropriate solvent which is not miscible with the phase under consideration. It is also possible by associating several series of units on a single shaft to operate according to the classical system which include an extraction, a purification by washing, and an elution. This can be readily understood by a reference to FIGURE 2 in which the treatment of the liquid 10 flowing from right to left might be with one immiscible liquid in the two righthand units and with another immiscible liquid in the three lefthand units.

It wll be observed that in this invention the two immiscible liquids flow in courses approximately parallel to each other, in opposite directions and are repeatedly mixed with successive parts of each other so that each volume of each liquid is treated in sequence by successive volumes of the other liquid. Thus, if the liquid 10 is being purified by the liquid 10a it undergoes successive purifications in each unit, beginning with a purification by the largely contaminated head of liquid 10a found in the righthand unit of FIGURE 2, and ending in its already purified state with a single purification in contact with a volume of the uncontaminated liquid 10a in the lefthand unit of FIGURE 2.

As many apparently widely different embodiments of the present invention may be made without departing from the spirit and scope thereof, it is to be understood that the invention is not limited to the specific embodiments.

What is claimed is:

1. Apparatus for mixing immiscible liquids which comprises a rotatable member and mounted thereon for rotation therewith at least one mixing unit which includes, spaced about the member, first and second adjacently and parallely disposed containers connected at their bases by a first conduit, a weir formed by the end of said first conduit extending into and parallel to the base of the first container, a second conduit projecting into and perpendicular to the base of said second container and extending therefrom, an elongated mixing tube connected at an intermediate point of said tube to the second conduit, one leg of the mixing tube having a constriction adjacent to the junction between the second conduit and the mixing tube, a plurality of containers adapted to receive the separated liquids, conduit means extending from the weir in the decanter means to the containers, said containers being arcuately arranged about the member so that the rotation thereof discharges the separated liquids in sequence into the separate containers, and conduit means adapted, on further rotation, to discharge the separated liquids separately from the containers.

2. Apparatus for the countercurrent treatment of one liquid by another by stepwise, repeated, intermixing and separation of measured quantities of the two liquids, which comprises a plurality of conduit-interconnected units each of which includes first and second adjacently and parallely disposed containers connected at their bases by a first conduit, a weir formed by the end of said first conduit extending into and parallel to the base of the first container, a second conduit projecting into and perpendicular to the base of said second container and extending therefrom, an elongated mixing tube connected at an intermediate point of said tube to the second conduit, one leg of the mixing tube having a constriction adjacent to the junction between the second conduit and the mixing tube, measuring means at the ends of the units to supply measured quantities to the units, and means to discharge the liquids from the apparatus after the treatment, the arrangement providing for one operation in one position of the apparatus and for a different operation in another position thereof.

References Cited by the Examiner
UNITED STATES PATENTS

| | | | |
|---|---|---|---|
| 2,594,675 | 4/52 | Norell | 23—270.5 |
| 2,754,179 | 7/56 | Whatley | 23—270.5 |
| 2,765,298 | 10/56 | Signer | 23—270.5 X |
| 2,778,717 | 1/57 | Decker | 23—310 |
| 2,892,688 | 6/59 | Buchler | 23—270.5 |
| 2,895,808 | 7/59 | Hartley | 23—270.5 X |
| 2,967,093 | 1/61 | Raymond | 23—270.5 |
| 2,973,250 | 2/61 | Peniston | 23—270.5 |
| 2,980,179 | 4/61 | Renner | 23—270.5 |

OTHER REFERENCES

Wilhelm & Foos, "A Counter Current Liq-Liq Extractor," U.S. Atomic Energy Comm., Sept. 8, 1955, Iowa State College Report No. 458.

NORMAN YUDKOFF, *Primary Examiner.*

JAMES H. TAYMAN, *Examiner.*